US006965803B2

(12) United States Patent
Bungert et al.

(10) Patent No.: US 6,965,803 B2
(45) Date of Patent: Nov. 15, 2005

(54) APPARATUS AND METHOD FOR COMMISSIONING AND DIAGNOSING CONTROL SYSTEMS

(75) Inventors: Ulrich Bungert, Stein (DE); Martin Kiesel, Poxdorf (DE)

(73) Assignee: Siemens Aktiengesellschaft, Munich (DE)

( * ) Notice: Subject to any disclaimer, the term of this patent is extended or adjusted under 35 U.S.C. 154(b) by 645 days.

(21) Appl. No.: 09/989,856

(22) Filed: Nov. 20, 2001

(65) Prior Publication Data

US 2002/0082483 A1   Jun. 27, 2002

(30) Foreign Application Priority Data

Dec. 22, 2000 (DE) .................... 100 64 798
May 23, 2001 (DE) .................... 101 25 384

(51) Int. Cl.[7] ............................................. G05B 15/00
(52) U.S. Cl. ...................... 700/83; 700/9; 700/10; 700/17; 700/18; 700/26; 700/29; 700/86; 700/87; 700/97; 715/734; 715/735; 715/736; 715/737; 715/853; 715/854; 715/965; 715/967; 715/970; 717/101; 717/104; 717/120; 702/183
(58) Field of Search ..................... 700/9, 10, 17, 700/18, 26, 29, 83, 86, 87, 97; 715/853, 854, 715/965, 967, 970, 734, 735, 736, 737; 717/101, 717/104, 120; 702/183

(56) References Cited

U.S. PATENT DOCUMENTS

| | | | | |
|---|---|---|---|---|
| 5,453,933 A | * | 9/1995 | Wright et al. ................ 700/181 |
| 5,508,909 A | * | 4/1996 | Maxwell et al. .............. 700/18 |
| 5,539,870 A | * | 7/1996 | Conrad et al. ............... 715/810 |
| 5,644,728 A | * | 7/1997 | Pillans ........................ 705/43 |
| 5,786,770 A | * | 7/1998 | Thompson ............. 340/825.02 |
| 5,852,439 A | * | 12/1998 | Musgrove et al. .......... 715/764 |
| 6,118,448 A | * | 9/2000 | McMillan et al. .......... 717/127 |
| 6,201,996 B1 | * | 3/2001 | Crater et al. ................. 700/9 |
| 6,337,700 B1 | * | 1/2002 | Kinoe et al. ................ 715/854 |
| 6,337,717 B1 | * | 1/2002 | Nason et al. ............... 348/567 |
| 6,393,472 B1 | * | 5/2002 | Anerousis et al. ........ 709/223 |
| 6,529,780 B1 | * | 3/2003 | Soergel et al. .............. 700/10 |
| 6,546,297 B1 | * | 4/2003 | Gaston et al. .............. 700/83 |
| 6,832,120 B1 | * | 12/2004 | Frank et al. ................ 700/65 |

* cited by examiner

Primary Examiner—Anthony Knight
Assistant Examiner—Douglas Shute
(74) Attorney, Agent, or Firm—Baker Botts L.L.P.

(57) ABSTRACT

The engineering of automation systems is configured more simply where the functionality of a control system is implemented via an object model. The object model permits the functional interconnection of technological objects. For this purpose, a project browser ensures the display of the interplay of all the components involved in an application in their mutual relationships.

19 Claims, 4 Drawing Sheets

APPARATUS AND METHOD FOR COMMISSIONING AND DIAGNOSING CONTROL SYSTEMS

CROSS REFERENCE TO RELATED APPLICATION

This application claims foreign priority to German application number 10064798.7 filed Dec. 22, 2000 and German application number 10125384.2 filed May 23, 2001.

FIELD OF THE INVENTION

The present invention relates to an apparatus and method for commissioning and diagnosing control systems. In particular, the present invention relates to an apparatus having an engineering system for compiling a control program.

BACKGROUND OF THE INVENTION

The commissioning, operation and diagnosis of automation systems and drives are increasingly carried out completely electronically. Mechanical systems and drives of automatic machines are controlled by microcontrollers, using appropriate software (run-time systems). The corresponding control programs are developed on a PC in an engineering system, and subsequently loaded into the run-time system which is responsible for the timed control of the system to be controlled. The engineering system is also used for the commissioning, project engineering, configuration of controls and drives.

The increasing complexity of automatic machines likewise requires more complex control systems and therefore more complex control programs. Previous engineering tools provide rudimentary information, which is supplied to the user in the form of individual items of information. Data preparation is generally carried out manually.

SUMMARY OF THE INVENTION

The object of the present invention is to provide the user with the most intuitive and simplest way of observing and optimizing the state of the control system and the behavior of the machine sequence. This object is achieved by an apparatus for commissioning and/or diagnosing control systems, having a display device for displaying the functionality of the control system via an object model, and an engineering system for compiling a control program on the basis of the functionality of the control system displayed via the object model. The foresaid object is further achieved by means of a corresponding method.

Various preferred embodiments of the present invention are disclosed in the dependent claims which are hereby incorporated by reference in this specification. Further, it has been found to be particularly preferred where the method according to the present invention permits scaled and stepwise commissioning and diagnosis.

BRIEF DESCRIPTION OF THE DRAWINGS

The present invention is explained below in greater detail in connection with a preferred embodiment and the drawings, in which.

DETAILED DESCRIPTION OF THE INVENTION

Figure 1:
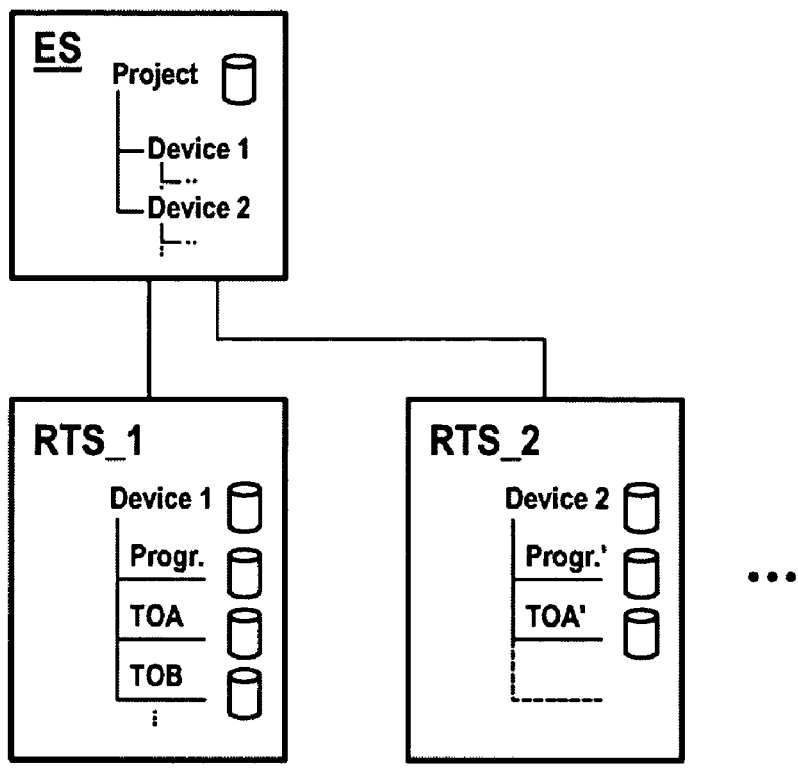
FIG. 1 shows a diagram of the object model according to the invention.

FIG. 1 illustrates a control system for automation in schematic form. The control system comprises an engineering system ES with which a control program can be compiled. Furthermore, the control system comprises one or more run-time systems RTS. In the engineering system ES, a control program is developed which is based on an object model. The object model comprises technological objects, such as positioner axes, synchronous axes, cam disks, etc., each of which can be connected to other technological objects or to one another in accordance with their functionality. By using one or more connected technological objects TOA, TOB, etc., together with an appropriate program, the control of a device (Device 1, Device 2, etc.) may be formulated.

FIG. 1 shows that with the aid of the engineering system ES different device controllers Device 1, Device 2, can be implemented for a plurality of run-time systems RTS_1, RTS_2 within a project. It is therefore possible for different control functionalities to be implemented via the object model. The object model is effective in the engineering system and/or run-time system and is the basis for the engineering of the control. This means that the commissioning, the programming, the diagnosis and so on can be carried out on the basis of the object model.

The objects used in the object model can be categorized into different object types. Such object types are, for example:

"Project"—which serves as a container for engineering data from a user project;

"Device"—which represents a device, for example a controller;

"Program"—which serves as a container for the administration and storage of user programs;

"Technological object"—which corresponds to a positioner axis, a synchronous axis, a measuring sensor, a cam disk, etc.; and "Drive object"—which represents one or more drives used in the control.

Figure 2:
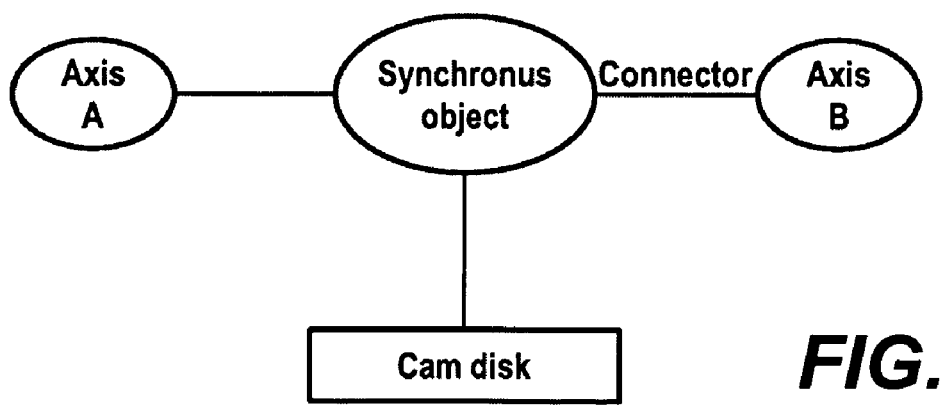
FIG. 2 shows a configuration of an actual control project.

FIG. 2 shows the concrete configuration or instancing of the control of a device having two axes A and B. The transmission ratio between the axis A and the axis B is controlled by a synchronous object. For example, the transmission ratio of the synchronous object can be varied by a cam disk. The individual objects axis A, synchronous object axis B and cam disk are connected by connectors which represent the respective functional relationship. The drive of the axes A and B can therefore be implemented with the aid of the object model.

Figure 3:
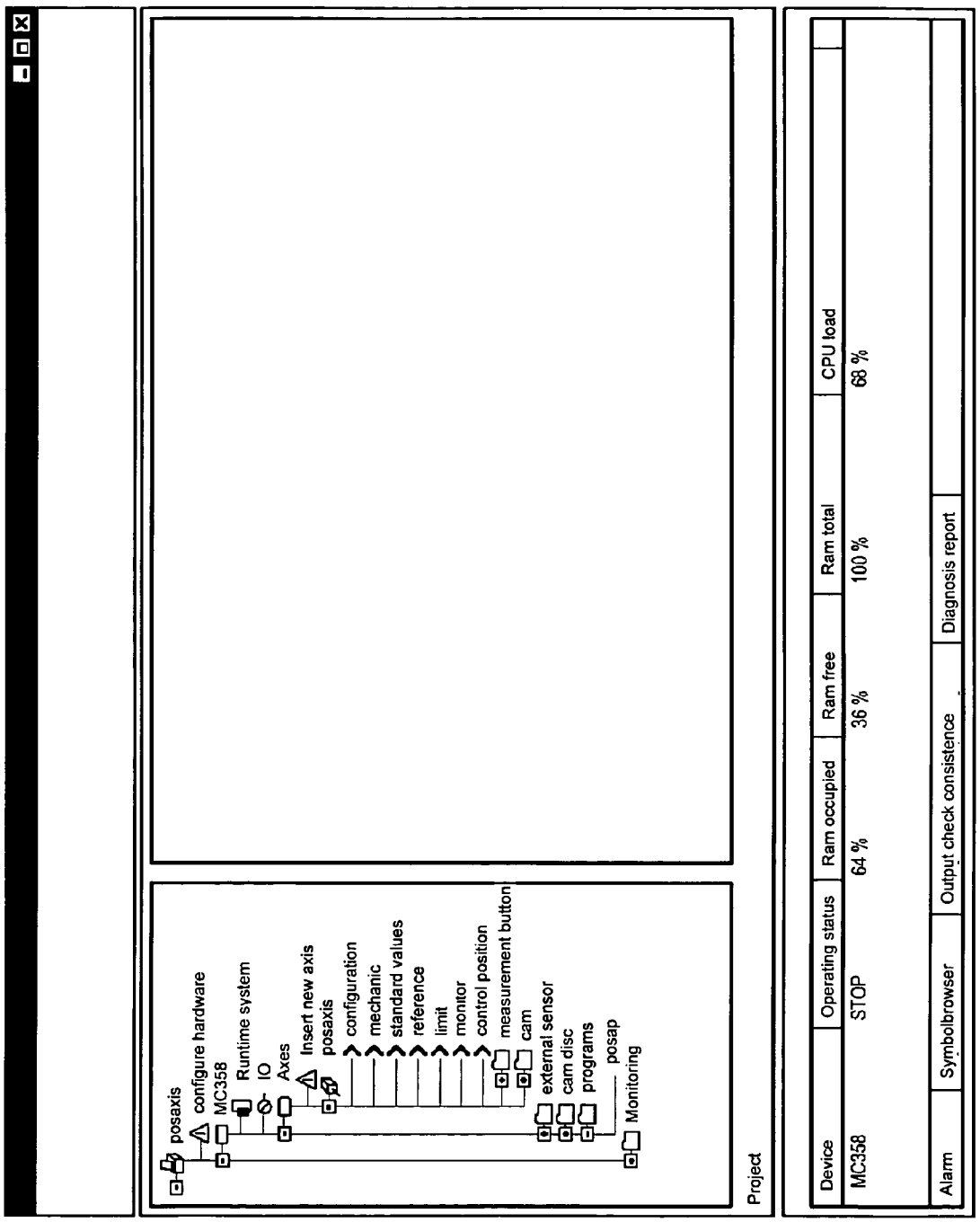
FIG. 3 shows a example of a project browser and instances of significant object types.
Figure 4:
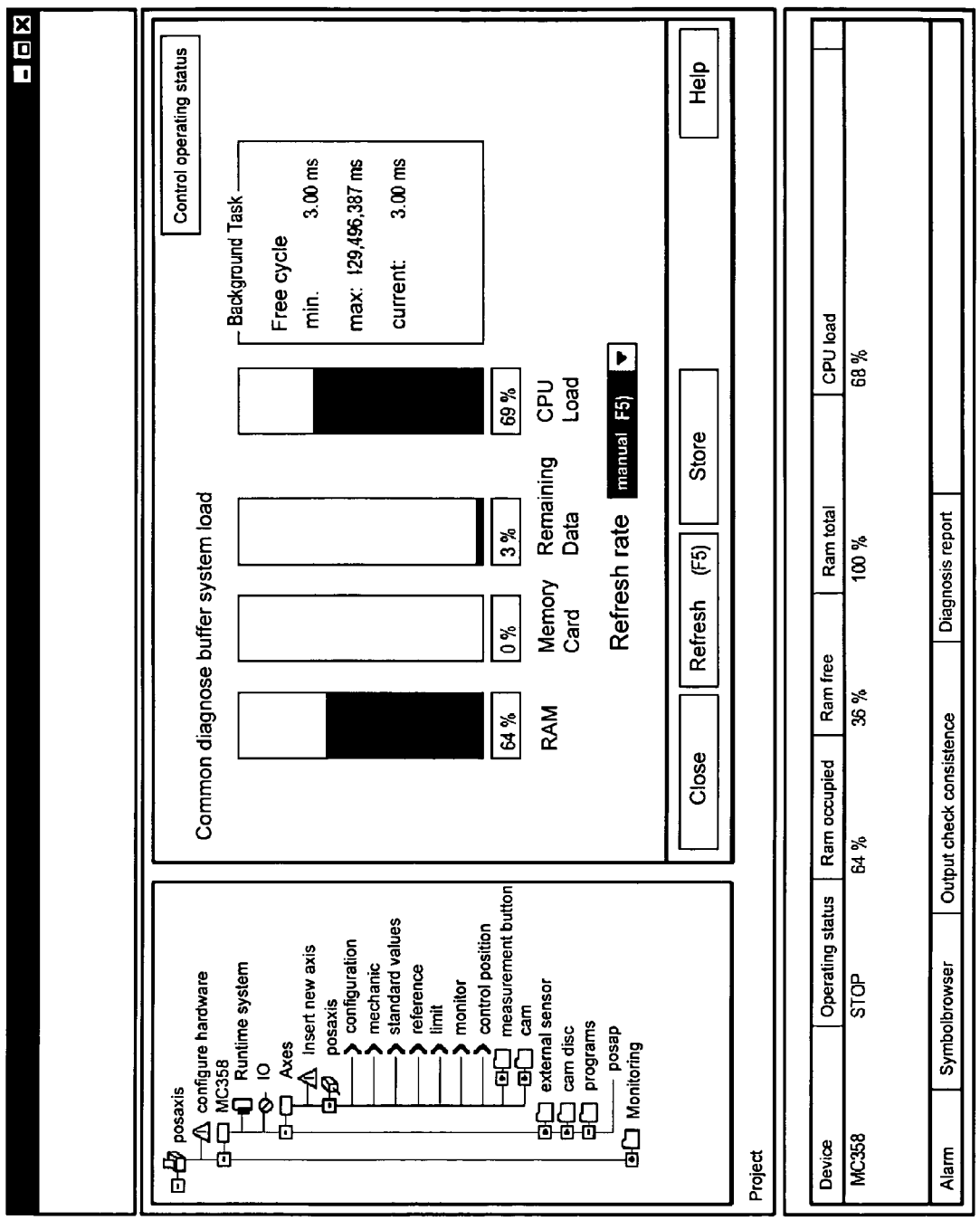
FIG. 4 shows a more detailed display of device information.

The individual objects and their functional connections have to be visualized, in particular for the development of control projects. For this purpose, use is made of the project browser which is illustrated in FIG. 3 and which shows instances of significant object types. In the present case, at the "device" level, information about the operating state, the memory used and the CPU loading relating to the device "MC 358" is presented. If the user navigates to other objects with the aid of the project browser, then the information is displayed in the respective viewing window. By means of this project browser in the engineering system, it is therefore possible for relatively complex control systems to be assembled comprehensibly and in accordance with the requirement.

According to the present invention, the interplay of all the components involved in an application is displayed in the project browser. This ensures a total overview of the processes proceeding in the machine, and the user is enabled to call-up the depth of information required in each commissioning step. In particular, in distributed systems access to all the necessary information and the overview of the interplay of distributed functions is necessary in order to be able to carry out system optimization.

The ability to handle or use the system is improved significantly by the information being presented stepwise, and by the possibility of making changes. Depending on the selected instance depth, the user obtains different items of information or different options for changing parameters. It is therefore no longer necessary to search among a large number of system parameters where specific functionality is to be changed. Instead, the individual parameters are bundled by objects or functionalities and presented to the user in this bundled form.

In addition, the stepwise presentation of information offers direct links for the automated optimization of the machine sequence, thereby virtually achieving the aim of carrying out commissioning as far as possible without documentation. In addition, system optimization with respect to performance and more efficient memory use provides a significant decision base for the user. In this connection, FIG. 2 shows one possible way of presenting device information in more detail. In the specific example, the memory use and the system loading of the "MC 358" are displayed in detail. Such detailed information can be helpful for specific optimization steps.

Figure 5:
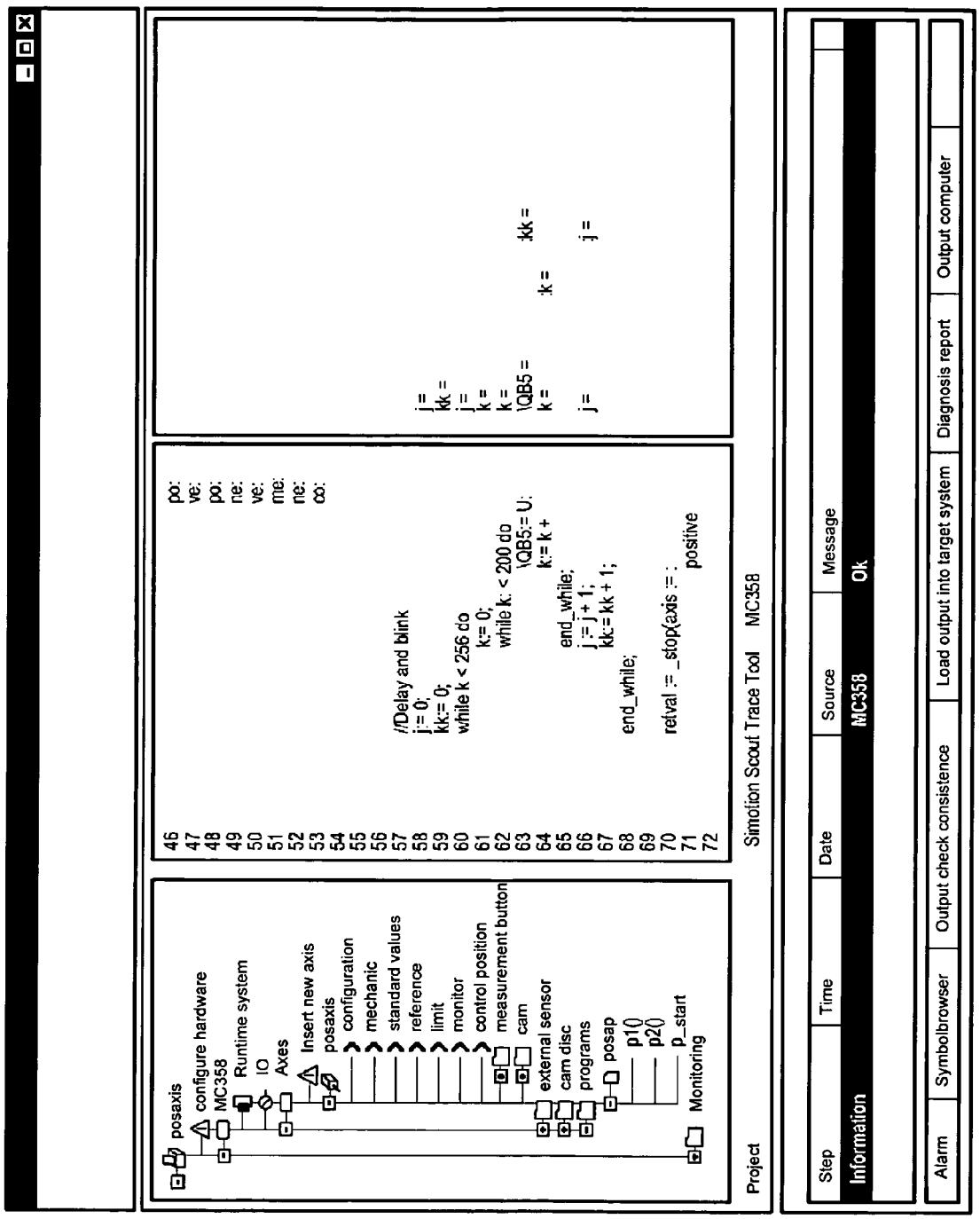
FIG. 5 shows a display of a function for the online observation of a user program at the "program" object level.

FIG. 5 shows a function for the online observation of a user program, at the "program" object level. This tool is used to test user programs. In this context, direct access is provided to further relevant tools (e.g., the "Simotion Scout Trace Tool"), which make it possible for a user to change over quickly into a respectively relevant tool. In this case, the trace tool offers the possibility of recording signals from the controller. The progress of the data or curve recorded is in turn used to optimize the control system or to support the commissioning of the control or its diagnosis.

The system according to the present invention therefore has the following advantages:
- the functionality of the control is represented via an object model;
- the object model is effective in the engineering system and/or run-time system;
- the object model is the basis for the engineering of the control (for e.g. commissioning, programming, etc.);
- the object model is the basis for holding data in the control;
- the instances of the control objects are visualized in the engineering system via a project browser;
- the engineering system offers staged access to diagnostic information and commissioning tools, based on the instances of the control objects;
- the project browser visualizes 1 to n control devices, the interlinked drives and further field-based devices;
- relationships between object instances are visualized in the project browser (e.g. link between positioner axis and drive);
- in each case context-sensitive information is visualized by means of navigation in the project browser; and
- by means of navigation in the project browser, in each case context-sensitive relevant tools are provided.

Furthermore, the following advantages are to be particularly emphasized:
- the control system can have on-line and off-line data holding (on-line: storage in the run-time system, off-line: storage in the engineering system); and
- when changing over to on-line operation (building up the link between the engineering system and run-time system) data consistency between on-line and off-line data holdings is checked, and inconsistencies are visualized in the project browser.

The system and method according to the present invention described above may be implemented as a computer program in languages known for this purpose. A computer program implemented in this way can be stored and transported via electronic data routes, in a likewise known way, or else on data carriers.

We claim:

1. An apparatus for commissioning and/or diagnosing a control system, comprising an engineering system comprising a display device for displaying a control system's functionality via an object model, and at least one control system coupled with the engineering system wherein the engineering system is operable to define and control the functionality of the control system through configuration of different objects of the object model on the display device, wherein the object model comprises a plurality of different objects for defining a control system with hierarchical levels including at least a project level, a device level, and a component level.

2. The apparatus according to claim 1, wherein data for the control system is administered on the basis of the object model.

3. The apparatus according to claim 1, wherein access to diagnostic information and commissioning tools to be implemented by the engineering system on the basis of the object model is staged through the hierarchical levels.

4. The apparatus according to claim 3, wherein the instances of objects, are visualized in the engineering system via a project browser.

5. The apparatus according to claim 4, wherein during navigation in the project browser, context-sensitive information and relevant tools to be executed are visualized.

6. The apparatus according to claim 1, wherein data on-line or off-line is held by the control system.

7. The apparatus according to claim 6, wherein the off-line and on-line data is visualized in a staged manner in the project browser.

8. A computer program for implementing the apparatus according to claim 1.

9. A data carrier for storing a computer program according to claim 8.

10. A data processing device comprising a computer program according to claim 8.

11. The apparatus according to claim 6, wherein the on-line data is held in a run-time system and off-line data is held in the engineering system.

12. A method for commissioning and/or diagnosing a control system, comprising the steps of displaying the control system's functionality in an object model comprising a plurality of different objects for definition of a control system with hierarchical levels including at least a project level, a device level, and a component level, and commissioning, project engineering, configuring of the different objects is performed on the basis of the functionality of the control system displayed via the object model.

13. The method according to claim 12, wherein data for the control system is administered on the basis of the object model.

14. The method according to claim 12, wherein access to diagnostic information and commissioning tools implemented on the basis of the object model is staged through the hierarchical levels.

15. The method according to claim 14, where instances of objects and/or their mutual relationships are visualized via a project browser.

16. The method according to claim 15, wherein during navigation in the project browser, context-sensitive information is visualized and relevant tools are presented.

17. The method according to claim 12, wherein data is held on-line or offline.

18. The method according to claim 17, wherein data consistency between off-line and on-line data is visualized in the project browser.

19. The method according to claim 17, wherein the on-line data is held in a run-time system and the off-line data is held in the engineering system.

* * * * *